(12) United States Patent
Challa et al.

(10) Patent No.: US 6,700,922 B2
(45) Date of Patent: Mar. 2, 2004

(54) SYSTEM AND METHOD FOR ACQUIRING A RECEIVED SIGNAL IN A SPREAD SPECTRUM DEVICE

(76) Inventors: Raghu Challa, 11928, Tivoli Park Row #2, San Diego, CA (US) 92128; Farrokh Abrishamkar, 5218 Sandhill Ter., San Diego, CA (US) 92103; Ian Fevrier, 9936 Kika Ct. #3623, San Diego, CA (US) 92129; Serguei Glazko, 5156 Seashell Pl., San Diego, CA (US) 92130; Way-Shing Lee, 8555 Foucaud Way, San Diego, CA (US) 92129; Christopher Patrick, 14358 Dalhousie Rd., San Diego, CA (US) 92129; Gil Sih, 7804 Pipit Pl., San Diego, CA (US) 92129

( * ) Notice: Subject to any disclaimer, the term of this patent is extended or adjusted under 35 U.S.C. 154(b) by 0 days.

(21) Appl. No.: 10/426,219

(22) Filed: Apr. 30, 2003

(65) Prior Publication Data

US 2003/0193992 A1 Oct. 16, 2003

Related U.S. Application Data

(62) Division of application No. 09/941,362, filed on Aug. 28, 2001, now Pat. No. 6,580,746.
(60) Provisional application No. 60/282,664, filed on Apr. 9, 2001.

(51) Int. Cl.$^7$ .................................................. H04B 1/69
(52) U.S. Cl. ........................................ 375/147; 375/149
(58) Field of Search ................................ 375/130, 147, 375/145, 148, 144, 149; 370/335, 342, 441

(56) References Cited

U.S. PATENT DOCUMENTS

| | | | | | |
|---|---|---|---|---|---|
| 5,285,472 | A | * | 2/1994 | Leonard et al. | 375/150 |
| 5,490,165 | A | * | 2/1996 | Blakeney et al. | 370/335 |
| 5,644,591 | A | * | 7/1997 | Sutton | 375/142 |
| 5,696,762 | A | * | 12/1997 | Natali et al. | 370/320 |
| 5,710,768 | A | * | 1/1998 | Ziv et al. | 370/342 |
| 5,764,687 | A | * | 6/1998 | Easton | 375/147 |
| 5,781,543 | A | * | 7/1998 | Ault et al. | 370/342 |
| 5,790,589 | A | * | 8/1998 | Hutchison et al. | 375/149 |
| 5,805,648 | A | * | 9/1998 | Sutton | 375/367 |
| 5,867,527 | A | * | 2/1999 | Ziv et al. | 375/147 |
| 6,005,889 | A | * | 12/1999 | Chung et al. | 375/140 |
| 6,069,880 | A | * | 5/2000 | Owen et al. | 370/311 |
| 6,091,785 | A | * | 7/2000 | Lennen | 375/316 |
| 6,243,561 | B1 | * | 6/2001 | Butler et al. | 340/7.42 |
| 6,496,533 | B2 | * | 12/2002 | Lennen | 375/147 |
| 6,580,746 | B2 | * | 6/2003 | Challa et al. | 375/130 |
| 6,584,313 | B2 | * | 6/2003 | Butler et al. | 455/434 |

* cited by examiner

*Primary Examiner*—Tesfaldet Bocure
(74) *Attorney, Agent, or Firm*—Philip Wadsworth; Charles Brown; Bruce W. Greenhaus

(57) ABSTRACT

A spread spectrum wireless device (100) may include a receiver (110), a searcher (128), a search controller (130) and other features. The search controller (130) selectively generates control signals to control the searcher (128), which searches for a spread-spectrum signal. In one embodiment, the architecture of the searcher (128) is dynamically configurable by the search controller (130) to selectively search multiple channels using multiple frequency bins for the signal.

25 Claims, 7 Drawing Sheets

SYSTEM AND METHOD FOR ACQUIRING A RECEIVED SIGNAL IN A SPREAD SPECTRUM DEVICE

RELATED APPLICATIONS

This application is a divisional of U.S. application Ser. No. 09/941,362, filed Aug. 28, 2001 now U.S. Pat. No. 6,580,746. This application claims the benefit of provisional 60/282,604 filed on Apr. 9, 2001.

FIELD OF THE INVENTION

The present invention is directed generally to a wireless spread spectrum device, and, more particularly, to a system and method for acquiring a received signal in a wireless spread spectrum device.

BACKGROUND OF THE INVENTION

Spread spectrum modulation, including code division multiple access (CDMA) modulation, is one of several techniques for allowing a large number of system users to share a communication system. Other multiple access techniques include time division multiple access (TDMA) and frequency division multiple access (FDMA) systems. There are also analog frequency modulation (FM) based wireless communication systems, such as the Advanced Mobile Phone System (AMPS). In addition, many wireless communication devices employ global position system (GPS) techniques. Some wireless communication systems are capable of operating using multiple techniques, such as CDMA and GPS, or on different frequency bands, such as cellular or Personal Communication Services (PCS) bands.

To simplify the discussion, the background of the invention will focus on CDMA modulation techniques in a wireless communication system. The principles discussed, however, are generally applicable to any spread-spectrum system. CDMA modulation techniques are disclosed in U.S. Pat. No. 4,901,307, issued on Feb. 13, 1990, entitled "SPREAD SPECTRUM MULTIPLE ACCESS COMMUNICATION SYSTEM USING SATELLITE OR TERRESTRIAL REPEATERS", which is assigned to the assignee of the present invention, and the disclosure of which is incorporated herein by reference. The above-referenced patent discloses the use of a phase-coherent and chip-synchronous chip sequence that is defined as a pilot chip sequence, or pilot signal. The pilot signal can be used to provide phase and time acquisition and tracking, and multi-path correction.

Methods for acquiring signals are disclosed in the above-referenced patent and in the following patents: (1) U.S. Pat. No. 5,781,543, issued on Jul. 14, 1998 and entitled "POWER-EFFICIENT ACQUISITION OF A CDMA PILOT SIGNAL"; and (2) U.S. Pat. No. 5,805,648, issued on Sep. 8, 1998 and entitled "METHOD AND APPARATUS FOR PERFORMING SEARCH ACQUISITION IN A CDMA COMMUNICATION SYSTEM", both of which are assigned to the assignee of the present invention and the disclosures thereof are incorporated herein by reference.

When the wireless device is first powered on, the device must acquire a signal from a remote location, such as a base station transceiver system (BTS). A wireless CDMA communication device will typically be receiving pilot signals from a plurality of BTSs. The wireless device will search for the signals from the BTSs and will establish a communication link with a selected BTS to permit the reception and transmission of data, such as audio signals, over the established communication link. The selection of a particular BTS and the actual communication between the wireless communication device and the selected BTS are well known in the art and need not be discussed in detail herein.

As discussed in the above-referenced patents, in a CDMA communications system each BTS broadcasts the same pseudo-noise (PN) code pilot signal, but with a different phase offset. The pilot signal can be considered as a rotating phasor of the form:

$$s(t)=Ae^{(-\omega i+\phi)}.$$

To acquire the signal, the wireless CDMA device must synchronize with the phase, $\phi$, and frequency, $\omega$, of the signal transmitted by a BTS. The object of a "searcher" process in the wireless device is to find the phase, $\phi$, of the received signal. The searcher uses an estimated frequency, $\omega$. If the estimated frequency is not sufficiently close to the frequency of the pilot, the received signal will not be acquired.

Conventional search modes sequentially conduct a search of all possible PN phase offsets using a set of hypothetical search parameters. The search parameters may be varied before the next search sequence, or search sweep. Search parameters may include a search-slice size, or window, a coherent integration length, a non-coherent integration length, a presumed frequency error and Walsh and Quasi-Orthogonal Function (QOF) parameters, and other search parameters. Search parameters are discussed in more detail in the above-referenced U.S. Pat. No. 5,805,648. Conventional search methods are capable of searching for only a single pilot channel during each search sweep. In addition, conventional search methods are capable of using only a single presumed frequency error during each search sweep.

Conventional search methods perform reasonably well with single channel pilot signals broadcast over a bandwidth of approximately 1.25 MHz, or 1×signals. Conventional search methods also perform reasonably well when the frequency error range is low. Recently, several CDMA technologies, such as 3×direct spread (3×DS) signals, 3×multi-carrier (3×MC) signals and orthogonal transmit diversity (OTD) signals, have been developed that broadcast the pilot signal over broader frequency ranges or in multiple channels. In addition, the frequency error range in the newer CDMA technologies may be higher than in the 1×signals. Conventional search methods fail to take advantage of newer CDMA broadcast technologies. Conventional search methods also have a limited frequency range over which the phase of the pilot signal will be detected.

Therefore, it can be appreciated that there is a significant need for an improved system and method for acquiring a signal in a wireless spread-spectrum device. The present invention provides this and other advantages, as will be apparent from the following detailed description and accompanying figures.

SUMMARY OF THE INVENTION

The present invention is embodied in a system and method for acquiring a signal in a wireless spread-spectrum device, which provides greater flexibility than prior art acquisition architectures. In one embodiment, the present invention may be configured to search multiple channels for the signal during each search sweep. In another embodiment, the present invention may be configured to use multiple presumed frequency errors during each search sweep. In an exemplary embodiment, the present invention may be configured to search multiple channels using multiple presumed frequency errors during each search sweep.

DETAILED DESCRIPTION OF THE PREFERRED EMBODIMENTS

The present invention provides for increased flexibility in conducting a search sweep for a signal in a spread-spectrum wireless device. This allows the user, either manually or automatically, to configure the wireless device to search for the signal based on the operational conditions of the device.

Although the examples presented herein refer to a CDMA wireless telephone system, and more particularly to a system and method of acquiring a pilot signal in a CDMA wireless telephone system, the principles of the present invention are applicable to any spread-spectrum system.

Figure 1:
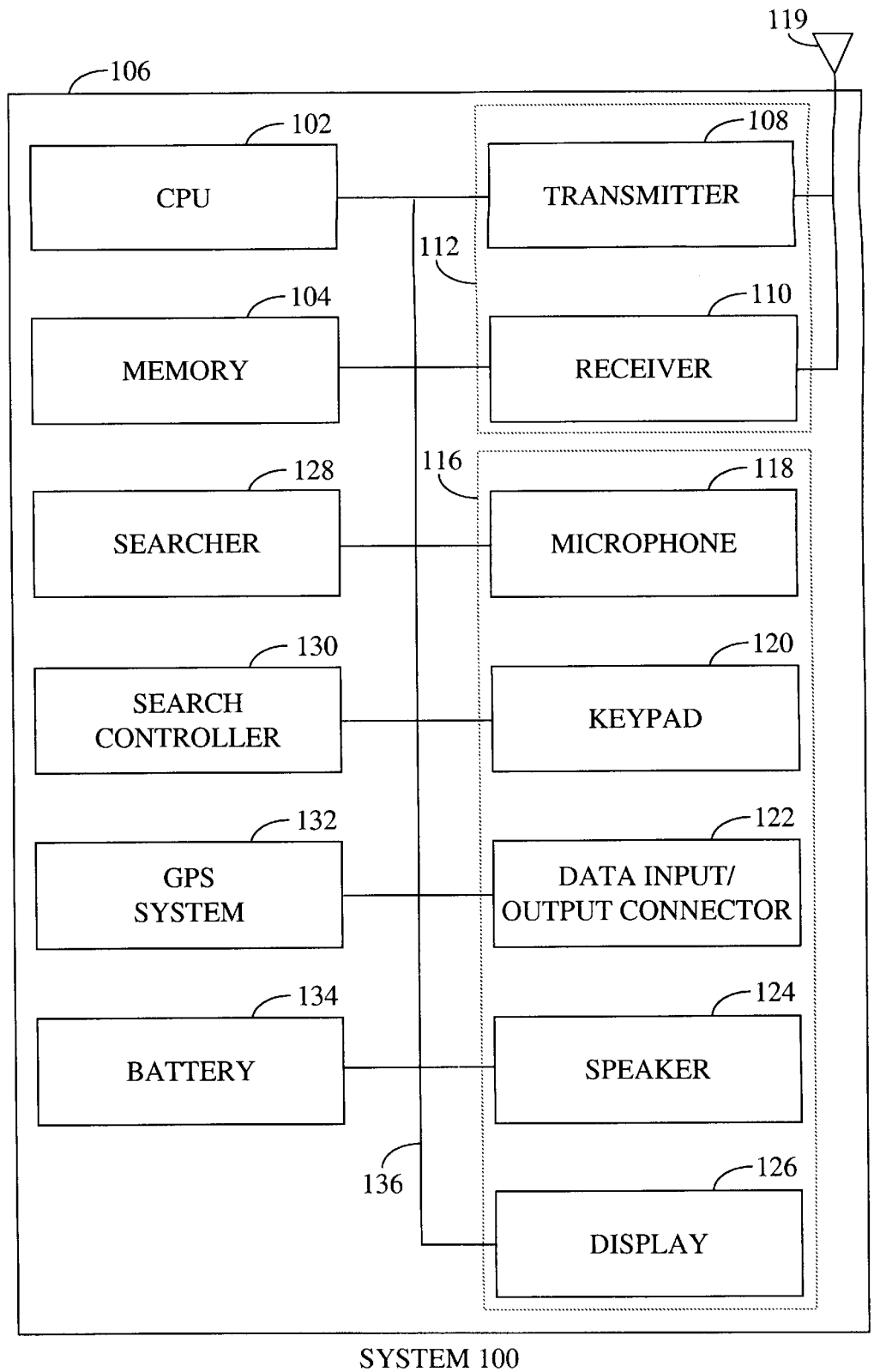
FIG. 1 is a functional block diagram of a CDMA communication device implementing the present invention.

The present invention is embodied in a system 100 illustrated in the functional block of FIG. 1. The system 100 includes a central processing unit (CPU) 102, which controls operation of the system. A memory 104, which may include both read-only memory (ROM) and random-access memories (RAM), provides instructions and data to the CPU 102. A portion of the memory 104 may also include non-volatile random-access memory.

Figure 2:
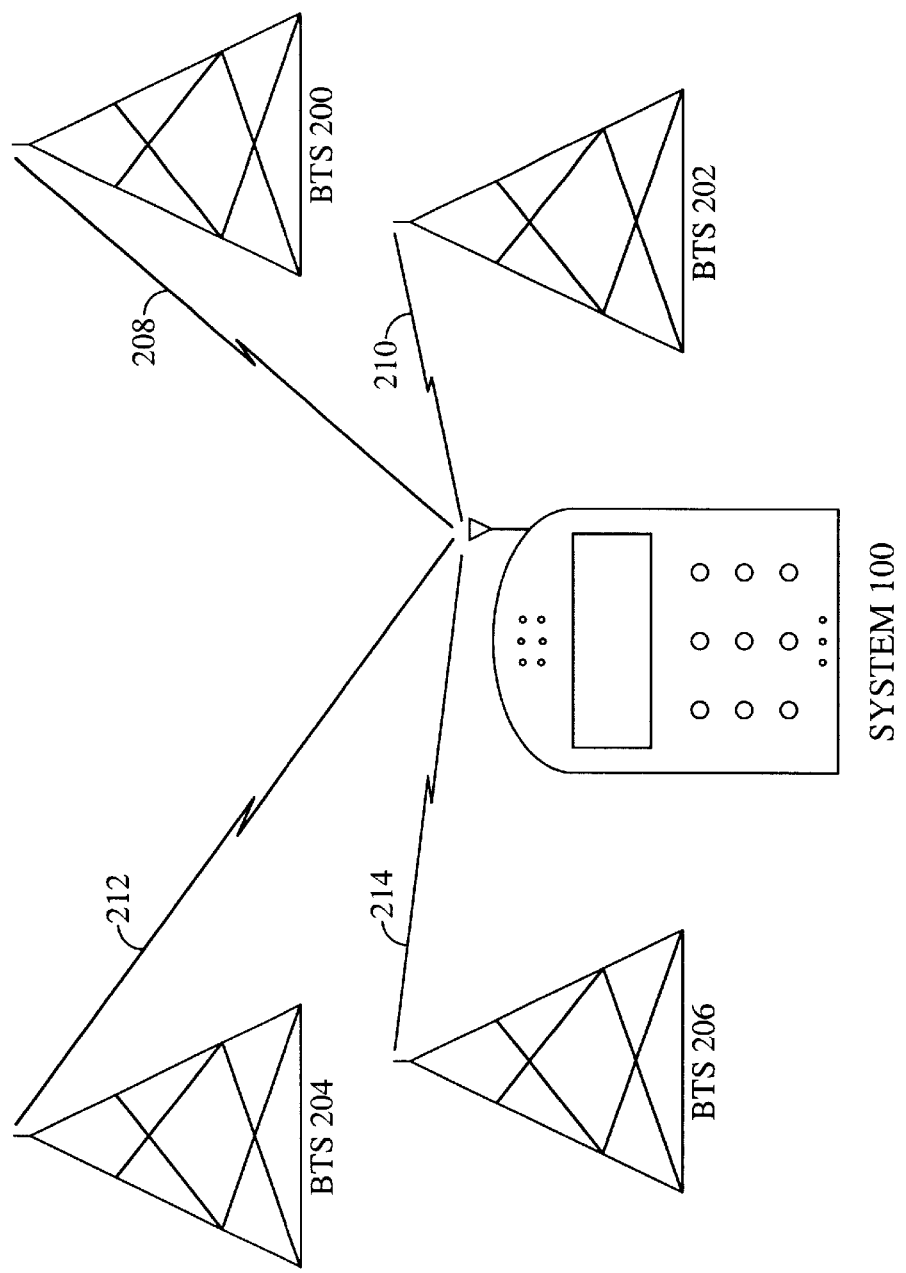
FIG. 2 illustrates the operation of the system of FIG. 1 to establish a communication link with a remote BTS.

The system 100, which is typically embodied in a wireless communication device, such as a CDMA telephone, also includes a housing 106 that contains a transmitter 108 and a receiver 110 to allow transmission and reception of data, such as audio communication, between the system 100 and a remote location, such as a BTS 200 (see FIG. 2). The transmitter 108 and the receiver 110 may be combined into a transceiver 112. An antenna 114 is attached to the housing 106 and electrically coupled to the transceiver 112. The operation of the transmitter 108, receiver 110, and antenna 114 is well-known in the art and need not be described herein. Although FIG. 1 illustrates the antenna 114 as extending from the housing 106, some designs may include an internal antenna that is contained completely within the housing. The transmitter 108, the receiver 110, and the antenna 114, however, operate in a conventional manner regardless of the location of the antenna.

A data-input/output system 116 is communicatively linked to the system 100 for operation by the user in a conventional manner. The data-input/output system 116 provides a convenient means by which destination telephone numbers, commands, digital data, voice data and other data may be entered. Although FIG. 1 illustrates the data-input/output system 116 as comprising a microphone 118, a keypad 120, a data-input/output connector 122, a speaker 124, and a display 126, contained within the housing 106, data may be received and reproduced for the user by other input devices, such as the receiver 110, and the like, alone and in various combinations.

The system 100 also includes a searcher 128, which searches for the phase of a pilot signal received from a BTS, and a search controller 130 to control operation of the searcher 128. The searcher 128, in response to control signals from the search controller 130, may be configured to search multiple channels using multiple presumed frequency errors. One skilled in the art will recognize that the searcher 128 may be implemented in a variety of ways, including as a separate component, such as a digital signal processor (DSP), an application-specific integrated-circuit (ASIC), or the like.

The search controller 130 is shown as a separate block in the functional block diagram of FIG. 1 because it performs specific functions that will be described in detail below. However, those skilled in the art will appreciate that the search controller 130 may be readily implemented as a series of software instructions placed in the memory 104 and executed by the CPU 102. Thus, minor software modifications to existing hardware will allow the implementation of the search controller 130. Alternatively, the search controller 130 may be implemented by a separate processor, such as a DSP, an ASIC, or the like. As will be discussed in greater detail below, the search controller 130 may selectively generate control signals to control the operation of the searcher 128.

The system may also include other types of wireless systems, such as a GPS system 132, which may also employ the searcher 128 and search controller 130 of the present invention.

Electrical components of the system 100 receive power from a battery 134, which is attached to and supported by the housing 106. In an exemplary embodiment, the battery 134 is a rechargeable battery. In other embodiments, the system 100 may include a connector (not shown) for the connection of an external power source, such as an automobile power adapter, AC power adapter, or the like.

The various components of the system 100 are coupled together by a bus system 136 which may include a power bus, control bus, and status signal bus in addition to a data bus. For the sake of clarity, however, the various buses are illustrated in FIG. 1 as the bus system 136.

FIG. 2 illustrates the system 100 and a plurality of BTSs 200–206. The system 100 will search for the signals from the BTSs 200–206 over communication links 208–214, respectively, and will establish a communication link with a selected BTS (e.g. BTS 200) to permit the transmission and reception of data, such as audio signals, over the established communication link. Once the signals from the BTS's 200–206 are found, the selection of the BTS and the actual communication between the system 100 and the selected BTS are well known in the art and need not be discussed herein.

As discussed above, the pilot signal can be considered as a rotating phasor of the form:

$$s(t) = Ae^{(-\omega i + \phi)}$$

Figure 3:
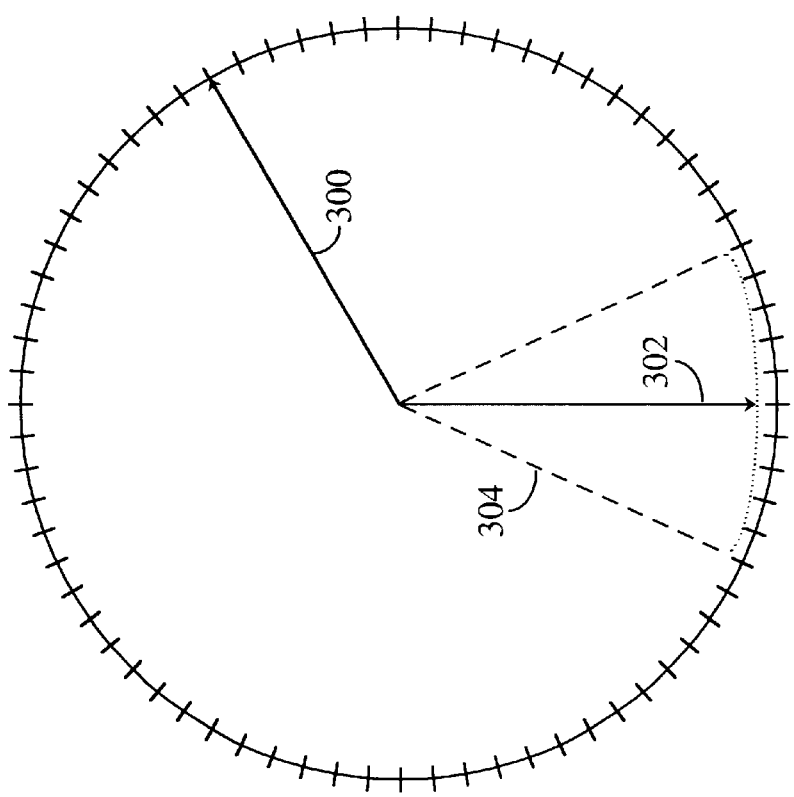
FIG. 3 is a graphic representation of the phase of a pilot signal.

FIG. 3 is a representation of the starting time of a pilot signal as conceptual hands 300–302 on a clock. Each BTS broadcasts the same pilot signal but with a different phase, which can be viewed as a different start time or position of a hand 300–302 on a clock. Each hand 300–302 represents a pilot signal broadcast by a different BTS. When viewed in this manner, a 1×signal typically starts at any one of 32,768 chips, which can be viewed as time units on a clock. The goal of a searcher can be viewed as finding the start time, or chip, for the pilot signals broadcast by each of several BTSs and selecting a particular BTS with which to establish a communication link. The searcher collects a search slice of data from the signal, or window 304, and compares it to a hypothetical PN data set. As those skilled in the art can appreciate, the term "window" refers to a selected sample size of chips. A window 304, for example, may gather a small set of, by way of example, 64 chips or a larger set of, by way of example, 256 chips of data. If there is a sufficient correlation between window 304 signal data and the hypothetical PN data set, the phase of a pilot signal is acquired.

Figure 4:
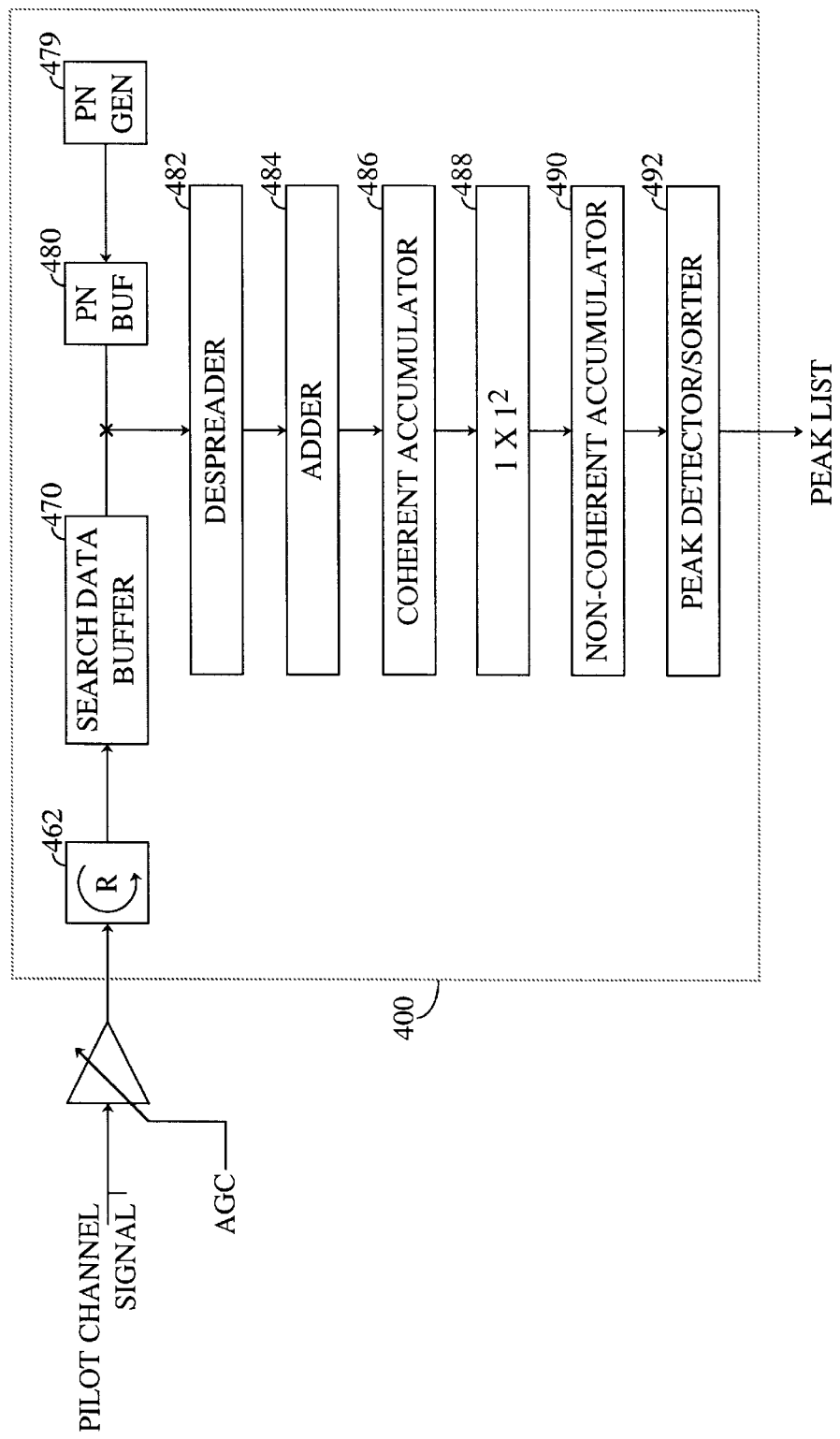
FIG. 4 is a functional block diagram of a prior art searcher of a wireless device.

FIG. 4 is a functional block diagram of a conventional searcher 400. The conventional searcher 400 searches a single channel for pilot signals broadcast by a plurality of BTSs (See FIG. 2). A rotator 462 compensates for a presumed frequency error by adjusting the phase of the received signal. One skilled in the art will recognize that the rotator 462 may be implemented using a variety of electronic components. For example, a DSP, a complex multiplier, a cordic rotator, or the like may be used to implement the rotator 462. Alternatively, a lookup table in a read-only memory may be employed, because the result of a given phase shift to a given received signal is known.

Output data from the rotator 462 is stored in a search data buffer 470 at the chip rate until a window of data is collected. The data is then paired with a data set generated based on a hypothetical PN pilot signal, which is generated by a PN generator 479 and stored in a PN buffer 480. The hypothetical PN pilot signal is based on a set of hypothetical search parameters, as discussed above. The paired data signals are then despread by a despreader 482 and processed by an adder 484, a coherent accumulator 486, an energy combiner 488, a non-coherent accumulator 490 and a peak sorter/detector 492, as is known in the prior art. When a sufficient correlation between the paired sampled signal data and the hypothetical PN pilot signal data exists, peaks will be present at certain chips in the result, indicating acquisition of the phase of a pilot signal. The searcher 400 then determines at which chips peaks were present and the relative strength of any peaks. The detected peaks and their relative strengths are stored on a peak list (not shown), which represents BTSs for which the phase of the pilot signal may have been acquired. The process described above is repeated until the pilot signed from several BTSs have been located and stored in the leak list. The wireless communication device then selects a BTS with which to establish a communication link based, at least in part, on the peak list.

One of skill in the art will recognize that the conventional searcher 400 may employ a plurality of PN generators and buffers when the operational speed of the searcher is such that multiple search windows can be gathered during each cycle of the pilot signal. For example, some conventional searchers can operate at four times the cycle rate of the pilot signal. Thus, the searcher 400 may take advantage of this speed difference by pairing additional window data sets to additional hypothetical data sets stored in additional PN buffers. When viewed as a clock (see FIG. 3), the searcher may be able to sample data, for example, from 1:00 to 2:00, 4:00 to 5:00, 7:00 to 8:00, and 10:00 to 11:00. Each sample is then compared to a different hypothetical PN data set, stored in a different PN buffer. Thus, more than one search sweep may be conducted at a time. Alternatively, a single search sweep may be conducted at a higher speed. Each search sweep, however, is limited to one channel and one presumed frequency error.

Figure 5:
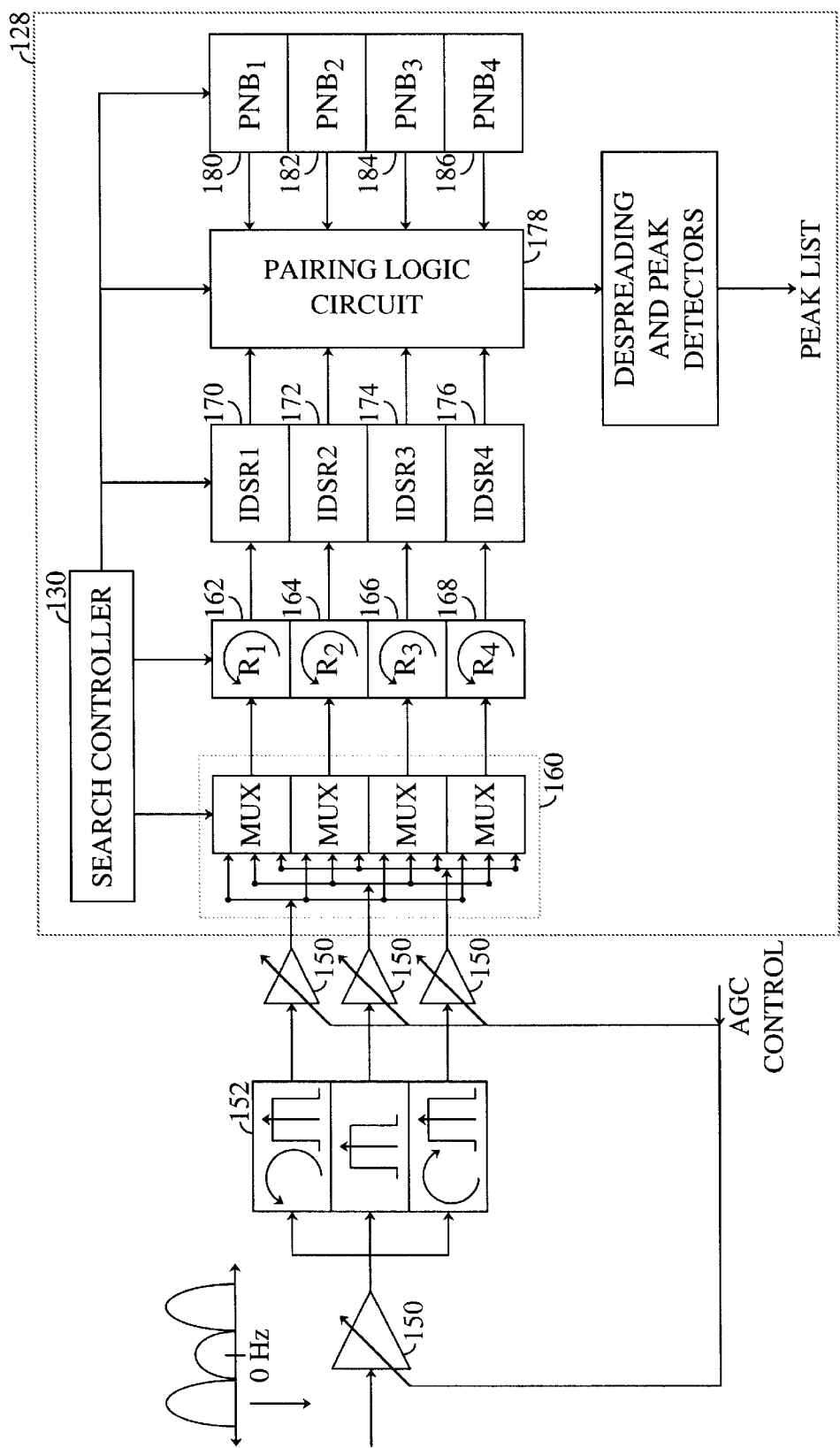
FIG. 5 is a functional block diagram of a searcher and a search controller implementing the present invention.

The present invention improves signal acquisition by increasing the flexibility of the searcher 128. FIG. 5 is a functional block diagram of one embodiment of a system 100 employing a searcher 128 of the present invention to search for the pilot of a 3×MC input signal. The receiver 10 (see FIG. 1) receives a signal in which the pilot signal is present. The pilot signal may be either a single-channel or a multi-channel pilot signal. FIG. 5 illustrates reception of a 3×MC input signal. In an exemplary embodiment the signal strength is normalized through the use of an automatic gain control (AGC) circuit 150. The AGC circuit 150, which typically includes one or more variable gain amplifiers and a signal strength detection circuit, is well known in the art and need not be described in greater detail herein.

The received signal is then processed by a filter 152 to separate the signal into its three component channels. The filter 152 may comprise two rotators and three band pass filters. The received signal is run through a band pass filter to eliminate the side channels. This provides a center channel output from the filter 152. The frequency of the signal from one of the side channels is centered by a rotator, which applies a phase shift to bring that side channel's frequency to the center-channel frequency. The signal is then passed through a band pass filter. This provides one of the side channel outputs from the filter 152. The process is repeated with the other side channel, producing the other side channel output. As discussed above, the rotators in the filter 152 may be implemented in any number of ways, as is known in the prior art.

The outputs from the filter 152 are provided to the signal routing circuit 160. The search controller 130 generates control signals to control the operation of the signal routing circuit 160. Based upon the control signals, the signal routing circuit 160 routes the signals to be searched to one or more of a plurality of rotators 162–168. One skilled in the art will recognize that the signal routing circuit 160 may be implemented in a number of ways. For example, the signal routing circuit 160 may consist of a plurality of multiplexer circuits, as shown in FIG. 5. When the received pilot signal is a multi-channel signal, the signal routing circuit 160 may be configured to route any one of the channels (e.g. any of the three outputs from the filter 152) to any one or more of the plurality of rotators 162–168, based upon control signals received from the search controller 130.

The search controller 130 also generates control signals to control the phase shift introduced by the rotators 162–168 of the signals to be searched for the pilot signal. Based upon control signals received from the search controller 130, the rotators 162–168 shift the phase of the received signals to compensate for a presumed frequency error, which is an estimate of the difference in frequency between the frequency of the remote device and the signal received from one of the BTSs (e.g. the BTS 200). A presumed frequency error may be zero. When multiple rotators 162–168 are employed, each rotator can be independently configured to introduce a different phase shift to compensate for a different presumed frequency error. As discussed above, the rotators 162–168 may be implemented in any number of ways, as is known in the prior art.

Figure 6:
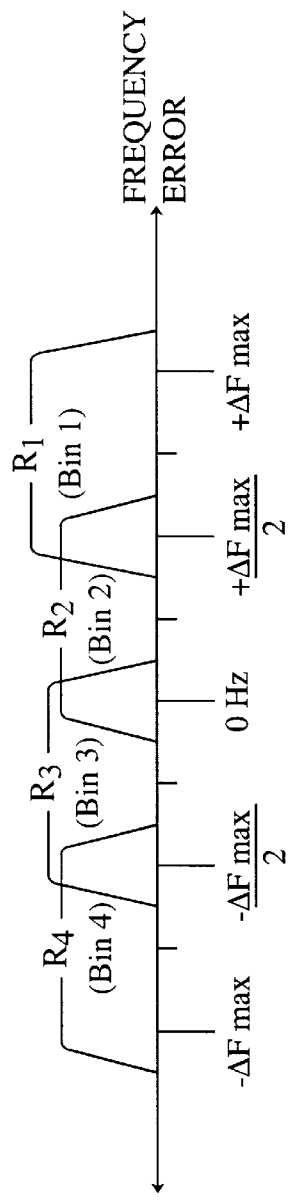
FIG. 6 illustrates the concept of frequency binning using four frequency bins.
Figure 7:
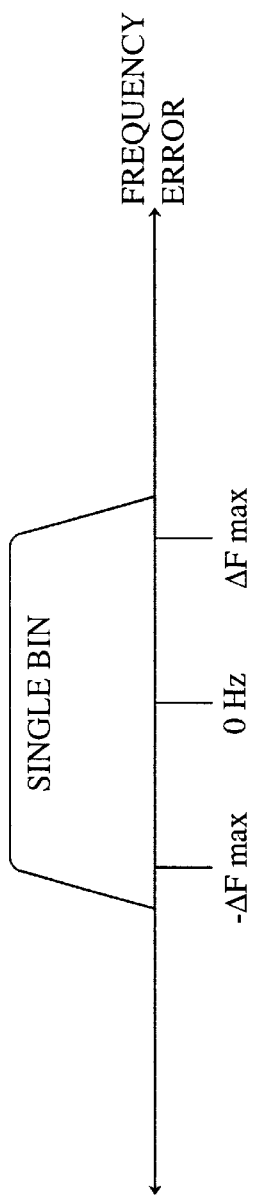
FIG. 7 illustrates the concept of frequency binning using one frequency bin.

When a rotator (e.g. rotator 162) shifts the phase of a signal based upon a presumed frequency error, a "frequency bin" is created. The frequency bin is the frequency range around the presumed frequency error in which detection of a pilot signal, if present, is likely to occur. FIG. 6 illustrates the use of four frequency bins to search for the pilot signal. FIG. 7 illustrates the use of a single frequency bin to search for the pilot signal with a presumed frequency error of zero.

The maximum frequency error range for which acquisition of the pilot signal is likely to occur is represented by $\Delta F_{max}$. Assuming the frequency error range in which acquisition of the pilot signal is likely to occur is the same for each frequency bin employed, the maximum frequency error range, $\Delta F_{max}$, will be approximately four times larger when four frequency bins are employed as shown in FIG. 6 than it is when one frequency bin is employed as shown in FIG. 7. Thus, the likelihood of acquiring a pilot signal when the frequency error is likely to be high is greatly increased when multiple frequency bins are employed. This multiple frequency bin configuration is particularly advantageous when the presumed frequency error range is large.

The output from the rotators 162–168 is stored in a plurality of searcher data buffers 170–176, which may conveniently be implemented as input data shift registers. The data buffers 170–176 store the data contained in the received signals. In one embodiment, the data buffers 170–176 are implemented using a single input data shift register logically divided into a number of fractional slices corresponding to the number of desired buffers. In this embodiment, the search controller 130 may generate control signals to configure the single data shift register into the appropriate number of fractional slices. In another embodiment, the data buffers 170–176 are implemented using individual data shift registers. The implementation of the data buffers 170–176 is a matter of design choice, which may include as a design factor the ability to re-use existing hardware of the system 100 and power consumption considerations.

A pairing logic circuit 178 pairs data in the data buffers 170–176 with data in a plurality of PN buffers 180–186. As discussed in more detail below, the pairing is based on the desired search sweep configuration. The data in the PN buffers 180–186 correspond to data from hypothetical PN pilot signals, based on a set of search parameters, as discussed above. The search controller 130 may generate control signals to control the pairing logic circuit 178. One skilled in the art will recognize that the pairing logic circuit 178 may be implemented in number of ways. For example, the pairing logic circuit 178 may consist of a plurality of multiplexer circuits.

The paired data sets are then processed to determine whether the phase of the pilot signal has been acquired, and if so to establish synchronization with a signal from a particular BTS (e.g. the BTS 200). As discussed above, methods for processing of the signals are well known in the prior art and need not be discussed in detail herein. The process, shown in the prior art block diagram of FIG. 4, may be briefly described as combining the energy of each signal pair to detect the presence of peaks at particular chips. The presence of a peak indicates that the phase of a pilot signal broadcast by a BTS (e.g. BTS 200) has been acquired. The searcher 128 maintains a list of peaks from which it selects a BTS with which the system 100 establishes a communication link.

The signal routing circuit 160 and the use of multiple rotators 162–168, each allow for greater flexibility than the prior art in configuring the searcher 128 to conduct a search sweep. When a multi-channel signal is received, the improved searcher 128 can search more than one channel at a time for the signal. In addition, when the frequency error range is likely to be high, the improved searcher 128 can acquire a signal over a wider frequency range than prior art through the use of multiple frequency bins.

The number of rotators 162–168, data buffers 170–178, and PN buffers 180–186 in a given embodiment is a matter of design choice. An increase in the quantity of a particular component provides for greater flexibility, but also results in greater costs and power usage. While the system 100 does not require one-to-one correspondence of the particular components, the quantities of each component are related to the modes in which the searcher 128 may be configured to operate, as shown by the examples discussed below. The quantity of each component can also be selected to take advantage of the speed of the system 100. For example, it the speed of the system 100 is such that four windows may be sampled during each cycle of the pilot signal, it may be desirable to have four rotators 162–168, to take advantage of the system speed. Each PN window sample can be independently processed by a corresponding one of the rotators 162–168, to thereby greatly increase the speed of acquisition.

In an exemplary embodiment, the rotators 162–168 and the data buffers 170–178 may be shared with other components of the system 100, such as the GPS system 132, and may be powered down when not in use. Although the GPS system 132 operates independently of the system 100, the GPS system 132 utilizes a large number of rotators. During the initial acquisition of the signal, or whenever the GPS system is not using all of its rotators, the rotators in the GPS system 132 may be allocated for use as the rotators 162–168 in FIG. 5.

The search controller 130 may be configured to generate control signals to control the operation of the searcher 128 based on a variety of factors, such as received user-input, the type of signal received, instructions received from a remote location, the success rate of prior searches, user and default settings, the quality of the connection with the remote location, the geographical location of the system 100, the presumed frequency error, available power, and the like and various combinations thereof. Those skilled in the art will recognize that the system 100 may be configured to generate control signals by the user, or may be preset to do so at the factory, or some combination thereof.

In an exemplary embodiment, the various components, such as the rotators 162–168, data buffers 170–176, and PN buffers 180–186, may each be individually enabled by the search controller 130 based on the parameters discussed above. Any components that are not enabled by the search controller 130 may be disabled and may further be powered down to reduce the current drain on the battery 134 (see FIG. 1).

For example, in the embodiment shown in FIG. 5, the system 100 can be configured for operation with a single pilot channel in what may be referred to as a Mode 1 search. The search controller 130 generates control signals to operate the system 100 in a particular mode designed to take advantage of these conditions. Thus, the search controller 130 may generate control signals to: (1) route the single pilot channel signal to a single rotator 162; (2) enable a single rotator 162; (3) enable a single data buffer 170; and (4) (by taking advantage of the faster speed of the searcher 128) pair the data in data buffer 170 with the hypothetical PN pilot data in each of the PN buffers 180–186.

The advantage of the system 100 is its versatile dynamically configurable architecture that permits operation of the wireless device in a number of different operational modes. Table 1, below, summarizes various examples modes in which the search controller 130 of the embodiment shown in FIG. 5 may generate control signals to operate the searcher 128. One skilled in the art will recognize that additional search modes may be employed.

TABLE ONE

| Mode | Rotator/Phase-Shift Presumed Freq. Error Plus Offset | | | | Searcher Data Buffers | | | | PN Buffer/Hypothetical Parameter Set Pairing | | | |
|---|---|---|---|---|---|---|---|---|---|---|---|---|
| | R1 | R2 | R3 | R4 | 1 | 2 | 3 | 4 | 1 | 2 | 3 | 4 |
| 1<br>Single Channel, Single Freq. Bin | 0 | Off | Off | Off | Ch 0 | Off | Off | Off | 1 | 2 | 3 | 4 |
| 2<br>Single Channel, Four Freq. Bins | $+\frac{3\Delta F}{4}$ | $+\frac{\Delta F}{4}$ | $-\frac{\Delta F}{4}$ | $-\frac{3\Delta F}{4}$ | Ch 0 | Ch 0 | Ch 0 | Ch 0 | 1 | 1 | 1 | 1 |
| 3<br>Single Channel, Two Freq. Bins | $+\frac{\Delta F}{4}$ | $-\frac{\Delta F}{4}$ | Off | Off | Ch 0 | Ch 0 | Off | Off | 1 | 2 | — | — |
| 4<br>3xMC Signal Single Channel Mode | Same as Modes 1, 2, 3 with the data buffers getting data from the "Best" 3xMC Channel, Channel B. | | | | | | | | | | | |
| 5.1<br>3xMC Signal Dual Channel Mode, Two Freq. Bins | $+\frac{\Delta F}{4}$ | $-\frac{\Delta F}{4}$ | $+\frac{\Delta F}{4}$ | $-\frac{\Delta F}{4}$ | Ch B1 | Ch B1 | Ch B2 | Ch B2 | 1 | 1 | 1 | 1 |
| 5.2<br>3xMC Signal Dual Channel Mode, One Freq. Bin | 0 | 0 | 0 | 0 | Ch B1 | Ch B1 | Ch B2 | Ch B2 | 1 | 2 | 1 | 2 |
| 6<br>3xMC Signal Three Channel Mode, One Freq. Bin, May Use Posterior Energy Combining | 0 | 0 | 0 | Off | Ch + | Ch 0 | Ch − | Off | 1 | 1 | 1 | — |
| 7.1<br>OTD Signal, Single Antenna Mode | Same as Modes 1, 2, 3 with the data buffers getting data from the same input channel and the search parameters configured for OTD signals. | | | | | | | | | | | |
| 7.2<br>OTD Dual Antenna Mode | Similar to Modes 5.1 and 5.2, but with the search parameters configured for OTD signals. | | | | | | | | | | | |
| 7.3<br>OTD Dual Antenna Mode Posterier Energy Combining | The setup can be similar to Mode 7.2, except that the posterior energy combiner is activated to combine the energies from the two pilots as in Mode 6 for 3xMC. | | | | | | | | | | | |

Modes 1–3 utilize a single channel but with varying numbers of frequency bins based on the presumed frequency error range. Mode 1, which is discussed in the above example, may be implemented when a single channel is to be searched and the frequency error range is presumed to be low. In mode 1, a single channel is searched at high speed with a single frequency bin. The frequency bin, illustrated in FIG. 7, covers the entire range of frequencies, $\Delta F_{max}$, over which acquisition of the signal phase, $\phi$, will be attempted.

In Mode 2, a single channel is to be searched, but the frequency error is presumed to be high. Thus, four frequency bins may be employed, each covering a portion of the frequency range to be searched, $\Delta F_{max}$. The search speed in mode 2 is lower than in mode 1 because each frequency bin is searched using the same set of remaining search parameters (search parameters other than the presumed frequency error). Thus, when the embodiment shown is FIG. 5 is configured to operate in mode 2, the search controller 130 generates control signals to: (1) route the single pilot channel signal to a each of the rotators 162–168; (2) enable each rotator 162–168 to apply a different phase-adjustment; (3) enable each data buffer 170–176; (4) store data based on the same hypothetical parameter set in each of the PN buffers 180–186; and (5) pair the data in each data buffer 170–176 with the hypothetical PN pilot data in PN buffers 180–186.

In Mode 3, a single channel is to be searched with a presumed moderate frequency error. Thus, a moderate search speed with 2 frequency bins is used. When the embodiment shown is FIG. 5 is configured to operate in mode 3, the search controller 130 generates control signals to: (1) route the single pilot channel signal to two of the rotators 162–164; (2) enable two rotators 162–164; (3) enable two data buffers 170–172; and (4) pair the data in each data buffer 170–172 with the hypothetical PN pilot data in each of PN buffers 180–182, resulting in four data pairs as follows: 170/180, 170/182, 172/180, and 172/182. In Table 1, the channel to be searched in Modes 1, 2 and 3 is referred to as Channel 0.

As illustrated in FIG. 5, the searcher 128 can receive and process multiple channels, such as a 3xMC signal processed by the filter 152, using its dynamically configurable architecture. Mode 4 can be used when only a single channel of a multi-channel signal is to be searched. The system 100 selects one of the channels for searching. The selection can be based on which of the channels is "best" according to some criteria. In Table 1, this channel is referred to as Channel B. For example, the channel with the highest received power can be selected for searching. Thus, Mode 4 can be viewed as a search in Mode 1, 2, or 3, with the best channel (i.e. Channel B) viewed as Channel 0. In this mode, the search controller 130 generates control signals to cause the signal routing circuit 160 to route the selected channel (e.g. Channel B) to the appropriate rotators 162–168.

In mode 5, two channels of a multi-channel signal, such as a 3×MC signal processed by the filter 152 as shown in FIG. 5, are to be searched. These selected channels are designated in Table 1 as Channel B1 and Channel B2. As in mode 4, the system 100, may use some criteria to determine which two channels of a multi-channel signal are to be searched. In the embodiment shown in FIG. 5, a Mode 5 search can be conducted using either a single frequency bin with each channel (e.g. mode 5.2), in which case two sets of search parameters may be employed, or using two frequency bins with each channel (e.g. mode 5.1), in which case one set of search parameters may be employed. In mode 5.1, the search controller 130 generates control signals to: (1) route the first selected pilot channel signal (e.g. Channel B1) to rotators 162–164; (2) route the second selected pilot channel signal (e.g. Channel B2) to rotators 166–168; (3) enable each rotator 162–168; (4) enable each data buffer 170–176; and (5) pair the data in data buffers 170–176 with the hypothetical PN pilot data in PN buffers 180–186 as follows: 170/180, 172/182, 174/184, 176/186, where each PN buffer 180–186 contains the same hypothetical PN pilot data.

In mode 5.2, the search controller 130 generates control signals to: (1) route the first selected pilot channel signal (e.g. Channel B1) to rotators 162–164; (2) route the second selected pilot channel signal (e.g. Channel B2) to rotators 166–168; (3) enable each rotator 162–168; (4) enable each data buffer 170–176; and (5) pair the data in data buffers 170–176 with the hypothetical PN pilot data in PN buffers 180–186 as follows: 170/180, 172/182, 174/184, 176/186, where PN buffers 180 and 184 contain one set of hypothetical PN pilot data and PN Buffers 182 and 186 contain another set of hypothetical PN pilot data.

In mode 6, three channels of a multi-channel signal, such as the 3×MC signal, are to be searched. In the embodiment shown in FIG. 5, a single frequency bin is used and a single set of search parameters is employed. This is because each channel requires a rotator (e.g. one of the rotators 162–168) for each frequency bin to be searched, and only four rotators are present in the embodiment shown in FIG. 5. Those skilled in the art will recognize that an alternative embodiment of the system 100 may include more rotators and/or other components (e.g. data buffers). As previously discussed, the actual design implementation is a trade-off between search speed and the cost of adding additional circuit components that, inter alia, require electrical power. The system 100 may also use posterior energy combining of the three signals. Those of skill in the art will also recognize that, in the embodiment shown in FIG. 5, the searcher 128 may be configured to simultaneously conduct a mode 6 search (e.g. using rotators 162–166) and a mode 1 search (e.g. using rotator 168).

In mode 7, an OTD signal is to be searched. An OTD signal broadcast two pilot signals. The search parameters may need to be adjusted to correspond to the parameters for an OTD signal. Otherwise, a mode 7 search can be viewed as a mode 4 or mode 5 search. In mode 7.1, only one of the OTD pilot signals is to be searched for the pilot, thus mode 7.1 is similar to mode 4, and the system 100 may be configured as in modes 1–3, with the hypothetical PN signal data modified to correspond to data appropriate for a hypothetical OTD pilot signal.

In mode 7.2, both of the OTD pilot signal channels are to be searched for the phase of the pilot signal, thus mode 7.2 is similar to mode 5, and the system may be configured as in modes 5.1 and 5.2, with the hypothetical PN signal data modified to correspond to data appropriate for a hypothetical OTD pilot signal. In mode 7.3, posterior energy combining of the OTD pilot signals may be employed, as may be done in mode 6 with the 3×MC pilot channels.

It should be noted that, for the sake of clarity, operational modes are discussed with respect to specific processing components. For example, Mode 3 is described using the rotators 162–164 and the data buffers 170–172. However, the flexible system architecture allows the use of other components in the searcher (e.g. the rotators 166–168 in Mode 3). The present invention is not limited to the specific embodiment shown in FIG. 5 nor to the component selection described for the various modes of operation.

Figure 8:
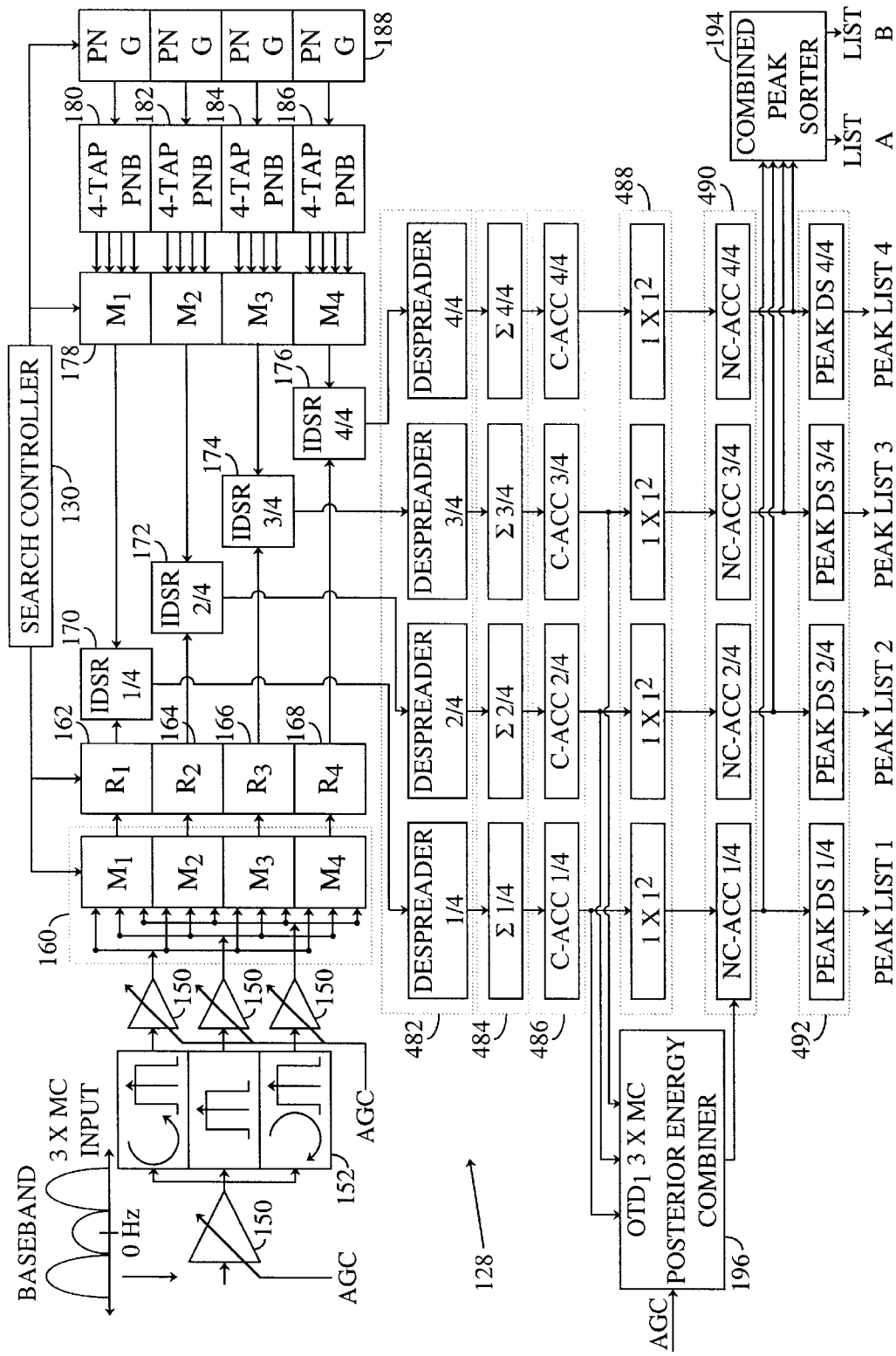
FIG. 8 is a functional block diagram of a searcher and a search controller implementing the present invention.

FIG. 8 is a functional block diagram of an alternative embodiment of a searcher 128 of the present invention, which may be conveniently implemented in any wireless spread-spectrum system. The embodiment in FIG. 8 is designed to take advantage of existing hardware in a wireless device, and in particular to avoid having to add additional hardware data shift registers. The embodiment shown in FIG. 8 is also designed to take advantage of a searcher 128 that operates at four times the speed of the signal cycle. This embodiment implements four data buffers 172–176 as fractional portions of a single input data shift register. Similarly, the despreader 482, adder 484, coherent accumulator 486, non-coherent accumulator 490, and peak sorter/detector 492 are logically divided into four fractional components. The pairing logic circuit 178 consists of four multiplexers $M_1$–$M_4$. The PN buffers 182–186 are implemented as four-tap buffers. Each of the PN generators 479 can be independently configured to generate hypothetical PN signal data based on different set of search parameters.

The embodiment shown in FIG. 8 also has three additional energy combiners 488 and a combined peak detector/sorter 194. The outputs from the four fractional portions of peak detector/sorter 492 and the combined peak detector/sorter 194 allow the system 100 to track the frequency bin and signal channel in which a peak is located. The combined peak detector/sorter 194, for example, may produce a single combined peak list A, if a single channel signal is searched using a single frequency bin. Alternatively, the combined peak/detector/sorter 194 can produce multiple peak lists if desired, for example, a peak list A corresponding to peaks for a first signal channel and frequency bin combination, and a peak list B corresponding to peaks for a second signal channel and frequency bin combination, as illustrated in FIG. 8.

The embodiment in FIG. 8 also has a posterior energy combiner 196, which may combine in some fashion the energy from each of the channels of a multi-channel signal, such as a 3×MC or OTD signal, if desired.

Table 2, below, summarizes various examples modes in which the search controller 130 of the embodiment shown in FIG. 8 may generate control signals to operate the searcher 128. One skilled in the art will recognize that additional search modes may be employed.

TABLE TWO

| Mode | Rotator/Phase-Shift Presumed Freq. Error Plus Offset | | | | Searcher Data Buffers | | | | PN Buffer/Hypothetical Parameter Set Pairing | | | |
|---|---|---|---|---|---|---|---|---|---|---|---|---|
| | R1 | R2 | R3 | R4 | 1 | 2 | 3 | 4 | 1 | 2 | 3 | 4 |
| 1<br>Single Channel,<br>Single Freq. Bin | 0 | 0 | 0 | 0 | Ch 0 | Ch 0 | Ch 0 | Ch 0 | 1 | 2 | 3 | 4 |
| 2<br>Single Channel,<br>Four Freq. Bins | $\frac{+3\Delta F}{4}$ | $\frac{+\Delta F}{4}$ | $\frac{-\Delta F}{4}$ | $\frac{-3\Delta F}{4}$ | Ch 0 | Ch 0 | Ch 0 | Ch 0 | 1 | 1 | 1 | 1 |
| 3<br>Single Channel,<br>Two Freq. Bins | $\frac{+\Delta F}{4}$ | $\frac{+\Delta F}{4}$ | $\frac{-\Delta F}{4}$ | $\frac{-\Delta F}{4}$ | Ch 0 | Ch 0 | Ch 0 | Ch 0 | 1 | 2 | 1 | 2 |

In mode 1, the embodiment shown in FIG. 8 is configured to search a single channel using a single frequency bin and four sets of hypothetical PN signal data. This mode takes advantage of the fact that the searcher 128 can complete four cycles during each cycle of the signal. The search controller 130 generates control signals to: (1) enable the energy combiners 488; (2) disable the posterior energy combiner 196; (3) route a single channel signal to be searched to each of the four rotators 162–168; (4) introduce the same phase offset with each rotator 162–168; (5) generate four independent sets of hypothetical PN signal data; (6) pair the data in the data buffers 170–176 with the data in the first tap of each of the corresponding PN buffers 180–186 during the first cycle of the searcher 128; (7) pair the data in the data buffers 170–176 with the data in the second tap of each of the corresponding PN buffers 180–186 during the second cycle of the searcher 128; (6) pair the data in the data buffers 170–176 with the data in the third tap of each of the corresponding PN buffers 180–186 during the third cycle of the searcher 128; and (9) pair the data in the data buffers 170–176 with the data in the fourth tap of each of the corresponding PN buffers 180–186 during the fourth cycle of the searcher 128. The paired data is processed by the searcher 128 to produce the peak lists 1–4 and the peak list A.

In mode 2, the embodiment shown in FIG. 8 is configured to search a single channel using four frequency bins and one set of hypothetical PN signal data. The search controller 130 generates control signals to: (1) enable the energy combiners 488; (2) disable the posterior energy combiner 196; (3) route a single channel signal to be searched to each of the four rotators 162–168; (4) introduce a different phase offset with each rotator 162–168, thus creating four different frequency bins; (5) generate four identical sets of hypothetical PN signal data; (6) sequentially pair the data in the data buffers 170–176 with the data in the each tap of each of the corresponding PN buffers 180–186. The paired data is processed by the searcher 128 to produce the peak lists 1–4 and the peak lists A and B.

In mode 3, the embodiment shown in FIG. 8 is configured to search a single channel using two frequency bins and two sets of hypothetical PN signal data. The search controller 130 generates control signals to: (1) enable the energy combiners 488; (2) disable the posterior energy combiner 196; (3) route a single channel signal to be searched to each of the four rotators 162–168; (4) introduce a certain phase offset with rotators 162 and 164, and to introduce a different phase offset with rotators 166 and 168, thus creating two different frequency bins; (5) generate two independent sets of hypothetical PN signal data and storing the first set of hypothetical PN signal data in PN buffers 180 and 184, and the second set of hypothetical PN signal data in PN buffers 182 and 186; (6) sequentially pair the data in the data buffers 170–176 with the data in each tap of each of the corresponding PN buffers 180–186. The paired data is processed by the searcher 128 to produce the peak lists 1–4 and the peak lists A and B.

One of skill in the art will recognize that the embodiment shown in FIG. 8 can also be configured to operate in other modes, such as modes 4–7 discussed above in conjunction with FIG. 5. When posterior energy combining is desired in modes 6 and 7.3, the search controller 130 generates control signals to disable the energy combiners 488 and enable the posterior energy combiner 196.

It should be noted that, for the sake of clarity, operational modes are discussed with respect to specific processing components. For example, Mode 3 is described using a particular phase shift with the rotators 162–164 and a different phase shift with the rotators 166–168. However, the flexible system architecture allows the use of other components in the searcher (e.g. using a particular phase shift with the rotators 162 and 166 and a different phase shift with the rotators 164 and 168). The present invention is not limited to the specific embodiment shown in FIG. 8 nor to the component selection described for the various modes of operation.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A searcher to search for a received signal in a spread-spectrum system, the searcher comprising:
   a reconfigurable signal routing circuit to route the received signal;
   a plurality of rotators to adjust the phase of the received signal and thereby generate a phase-adjusted signal;
   a plurality of searcher data buffers to store the phase-adjusted signal;
   a generator to generate a pseudo-noise (PN) signal;
   a PN buffer to store the generated PN signal;
   a pairing logic circuit to pair the stored phase-adjusted signal with the stored generated PN signal; and
   a search controller to generate control signals to control operation of the signal routing circuit, the rotators and the pairing logic circuit.

2. The searcher of claim 1 wherein the search controller also generates control signals to control operation of the generator.

3. The searcher of claim 1 wherein the search controller further generates control signals to control operation of the plurality of searcher data buffers.

4. The searcher of claim 3 wherein the rotators and searcher data buffers are selectively enabled and the received signal is a single channel signal and the search controller generates control signals:

to enable one of the plurality of rotators;

to route the received signal to the enabled rotator;

to adjust the phase of the received signal;

to enable one of the searcher data buffers;

to store the phase-adjusted signal in the enabled searcher data buffer; and to pair the phase-adjusted signal stored in the enabled searcher data buffer with the PN signal stored in the PN buffer.

5. The searcher of claim 1 wherein the phase adjustment applied by one of the plurality of rotators is zero.

6. The searcher of claim 1 wherein each of the plurality of rotators applies a different phase adjustment to the received signal.

7. The searcher of claim 1 wherein the plurality of searcher data buffers is comprised of an input data shift register.

8. The searcher of claim 1 wherein the plurality of searcher data buffers is comprised of a plurality of input data shift registers.

9. The searcher of claim 1, further comprising a plurality of generators to generate a plurality of PN signals and a plurality of PN buffers to store the plurality of generated PN signals.

10. The searcher of claim 9 wherein each of the plurality of PN buffers stores an identical generated PN signal.

11. The searcher of claim 1 wherein the received signal is a multi-channel signal and the search controller generates control signals to route a channel of the multi-channel signal to one of the plurality of rotators.

12. The searcher of claim 11 wherein the search controller generates control signals to route another channel of the multi-channel signal to another one of the plurality of rotators.

13. The searcher of claim 1, further comprising a filter to process the received signal into a multi-channel signal wherein the search controller generates control signals to route a channel of the multi-channel signal to one of the plurality of rotators.

14. The searcher of claim 13 wherein the search controller generates control signals to route another channel of the multi-channel signal to another one of the plurality of rotators.

15. The searcher of claim 1 wherein the spread-spectrum communication system is a code division multiple access system.

16. The searcher of claim 1 wherein the signal routing circuit comprises a plurality of multiplexer circuits.

17. The searcher of claim 1 wherein the pairing logic circuit comprises a plurality of multiplexer circuits.

18. The searcher of claim 1 wherein at least one of the plurality of rotators is shared with another component of the system.

19. The searcher of claim 1 wherein at least one of the plurality of searcher data buffers is shared with another component of the system.

20. The searcher of claim 1 wherein the received signal is a multi-channel signal with each channel of the multi-channel signal containing signal energy, further comprising a posterior energy combiner to selectively combine the energy of the channels of the multi-channel signal.

21. The searcher of claim 1 wherein the received signal is a pilot signal.

22. The searcher of claim 1 wherein the received signal is a multichannel pilot signal.

23. The searcher of claim 1 wherein the received signal is a global position system signal.

24. A searcher to search for a single channel received signal in a spread-spectrum system, the searcher comprising:

a signal routing circuit to route the received signal;

a plurality of rotators to adjust the phase of the received signal and thereby generate a plurality of phase-adjusted signals;

a plurality of searcher data buffers to store the plurality of phase-adjusted signals;

a plurality of generators to generate a plurality of pseudo-noise (PN) signals; and a plurality of PN buffers to store the plurality of generated PN signals;

wherein the system is dynamically configurable to independently apply a phase-adjustment with each of the plurality of rotators, to independently generate the plurality of generated PN signals, and to independently pair the phase-adjusted signals stored in the plurality of searcher data buffers with the PN signals stored in the plurality of PN buffers.

25. A searcher to search for a multi-channel received signal in a spread-spectrum system, the searcher comprising:

a signal routing circuit to route the channels of the received signal;

a plurality of rotators to adjust the phase of the channels of the received signal and thereby generate a plurality of phase-adjusted signals;

a plurality of searcher data buffers to store the plurality of phase-adjusted channel signals;

a plurality of generators to generate a plurality of pseudo-noise (PN) signals; and a plurality of PN buffers to store the plurality of generated PN signals;

wherein the system is dynamically configurable to independently route the channels of the received signal to any of the plurality of rotators, to independently apply a phase-adjustment with each of the plurality or rotators, to independently generate the plurality of generated PN signals, and to independently pair the phase-adjusted channel signals stored in the plurality of searcher data buffers with the PN signals stored in the plurality of PN buffers.

* * * * *

UNITED STATES PATENT AND TRADEMARK OFFICE
CERTIFICATE OF CORRECTION

PATENT NO. : 6,700,922 B2
DATED : March 2, 2004
INVENTOR(S) : Challa et al.

It is certified that error appears in the above-identified patent and that said Letters Patent is hereby corrected as shown below:

<u>Title page,</u>
Item [73], Assignee, please add:

-- [73] Assignee: Qualcomm Incorporated, San Diego, CA (US) --

Signed and Sealed this

Thirteenth Day of July, 2004

JON W. DUDAS
*Acting Director of the United States Patent and Trademark Office*